United States Patent
Ma

(10) Patent No.: US 12,404,948 B2
(45) Date of Patent: Sep. 2, 2025

(54) SOLENOID VALVE

(71) Applicant: HYDROTEK CORPORATION, Nantou Hsien (TW)

(72) Inventor: Cheng-Yi Ma, Nantou Hsien (TW)

(73) Assignee: HYDROTEK CORPORATION, Nantou (TW)

( * ) Notice: Subject to any disclaimer, the term of this patent is extended or adjusted under 35 U.S.C. 154(b) by 101 days.

(21) Appl. No.: 18/511,646

(22) Filed: Nov. 16, 2023

(65) Prior Publication Data
US 2024/0175514 A1   May 30, 2024

(30) Foreign Application Priority Data

Nov. 24, 2022   (TW) .................. 111212939

(51) Int. Cl.
*F16K 31/06*   (2006.01)
*F16K 7/12*   (2006.01)
*F16K 31/08*   (2006.01)

(52) U.S. Cl.
CPC .......... *F16K 31/0655* (2013.01); *F16K 7/12* (2013.01); *F16K 31/0651* (2013.01); *F16K 31/0675* (2013.01); *F16K 31/082* (2013.01); *F16K 31/084* (2013.01); *Y10T 137/3476* (2015.04); *Y10T 137/353* (2015.04)

(58) Field of Classification Search
USPC ............ 251/30.02–30.4, 65, 129.17, 129.21, 251/129.22; 137/221, 222
See application file for complete search history.

(56) References Cited

U.S. PATENT DOCUMENTS

| | | | | |
|---|---|---|---|---|
| 2,279,243 A | * | 4/1942 | Parsons ............... | F16K 31/0655 251/129.21 |
| 2,964,286 A | * | 12/1960 | Hoskins ................ | F16K 31/408 251/30.04 |
| 3,540,462 A | * | 11/1970 | Renzi ...................... | E04C 3/005 137/219 |
| 4,403,765 A | * | 9/1983 | Fisher .................. | H01F 7/1646 335/266 |
| 4,524,797 A | * | 6/1985 | Lungu ................... | F16K 31/082 137/625.65 |
| 4,598,736 A | * | 7/1986 | Chorkey ............. | F16K 31/0606 251/129.21 |
| 4,690,371 A | * | 9/1987 | Bosley ...................... | H01F 7/18 251/129.08 |
| 4,986,246 A | * | 1/1991 | Kessler de Vivie ........ | F16K 31/0651 251/129.21 |
| 5,375,811 A | * | 12/1994 | Reinicke ............... | F16K 31/082 137/550 |
| 5,524,862 A | * | 6/1996 | Feraboli .................... | F16K 7/02 251/30.05 |

(Continued)

*Primary Examiner* — Matthew W Jellett
(74) *Attorney, Agent, or Firm* — Sinorica International Patent & Trademark

(57) ABSTRACT

A solenoid valve includes a water inlet valve seat, a guide seat, a coil barrel, and a water outlet valve seat. When in an open state, an iron core is moved to close a pressure relief hole via an iron core spring and water pressure, and the diaphragm blocks the water flow of a water inlet via water pressure and the force of a guide spring, so as to achieve a bistable effect. The coil barrel includes two pairs of magnets and a pair of magnetically conductive sheets to form two magnetic routes. The solenoid valve has a simple structure and can be produced easily.

12 Claims, 10 Drawing Sheets

(56) References Cited

U.S. PATENT DOCUMENTS

| | | | | |
|---|---|---|---|---|
| 6,149,126 | A * | 11/2000 | Krimmer | F02M 25/0836 |
| | | | | 251/118 |
| 6,899,314 | B2 * | 5/2005 | Ott | F25B 41/345 |
| | | | | 335/229 |
| 6,994,308 | B1 * | 2/2006 | Wang | F16K 1/12 |
| | | | | 251/129.21 |
| 7,156,363 | B2 * | 1/2007 | Parsons | E03C 1/057 |
| | | | | 251/129.22 |
| 7,703,740 | B1 * | 4/2010 | Franklin | F16K 31/404 |
| | | | | 251/39 |
| 8,382,063 | B2 * | 2/2013 | Watanabe | F16K 31/0655 |
| | | | | 335/277 |
| 9,970,566 | B2 * | 5/2018 | Rovera | F16K 31/086 |
| 10,202,035 | B2 * | 2/2019 | Ogiwara | B60K 15/03519 |
| 10,208,870 | B1 | 2/2019 | Huang et al. | |
| 10,265,709 | B2 * | 4/2019 | Lin | B05B 1/1636 |

* cited by examiner

SOLENOID VALVE

FIELD OF THE INVENTION

The present invention relates to a solenoid valve for a fluid such as water, oil or gas, and more particularly, to a solenoid valve applied to an automatic water flusher.

BACKGROUND OF THE INVENTION

U.S. Pat. No. 10,208,870 discloses a solenoid valve. When the water is shut off, as shown in FIG. 4 and FIG. 5 of this patent, the sealing pad 34 is against the valve gate 26 inside the valve body 24. Referring to FIG. 6 and FIG. 7 of this patent, when the coil A is energized, the electromagnetic field generated by the coil will move the iron core 31 upwards for the sealing pad 34 to leave the valve gate 26, so that water can flow in via 12 the water inlet pipe 241 and flow out via the water outlet pipe 242.

However, as disclosed in U.S. Pat. No. 10,208,870, the direction of the piston 31 and the direction of the induced pressure are opposite, so they are against each other to occur water hammer, and the piston 31 is moved away by the force of water hammer. As a result, the water cannot be shut off effectively. The magnetic route of the magnet 14 passes through the magnetic shaft 33, the piston 31, the bottom cover 40 and the coil housing 10 from the upper half (N pole or S pole) of the magnet 14 and ends at the lower half of the magnetic shaft 33 (S pole or N pole). The bottom cover 40 and the coil housing 10 are made of a magnetically conductive material. Because the cross-section of the assembly of the bottom cover 40 and the coil housing 10 is in a C shape, the manufacturing cost and assembly time are increased. Besides, the magnet 14 is in contact with the magnetic shaft 33 to reduce the reluctance. The solenoid valve is unstable and the 24 efficiency is low. Accordingly, the inventor of the present invention has devoted himself based on his many years of practical experiences to solve these problems.

SUMMARY OF THE INVENTION

The primary object of the present invention is to provide a solenoid valve, which has a bistable effect to form two magnetic routes of magnets.

In order to achieve the above object, the present invention provides a solenoid valve. The solenoid valve comprises a water inlet valve seat, a guide seat, a coil barrel, a first magnet, a second magnet, and a water outlet valve seat. The water inlet valve seat includes a base. The base has a guide hole and at least one water inlet. One side of the base is formed with a first inner stop portion, an inner cylindrical portion, and an outer cylindrical portion. The inner cylindrical portion has a through hole. A flow passage is formed between the inner cylindrical portion and the outer cylindrical portion. The flow passage communicates with the through hole of the inner cylindrical portion. The outer cylindrical portion has a lower opening. The guide seat is disposed in the water inlet valve seat. The guide seat has a perforation. The guide seat includes a guide shaft, a guide spring, and a diaphragm. The guide shaft is arranged in the guide hole. One end of the guide spring abuts against the guide seat. The diaphragm is sleeved on the guide shaft and abuts against an inner surface of the inner cylindrical portion. The coil barrel is disposed in the water inlet valve seat. The coil barrel includes an axial tube, an upper seat, and a lower seat. Two ends of the axial tube are formed with a first portion and a second portion. The upper seat is arranged on an outer side of the first portion. Another end of the guide spring abuts against the upper seat. The lower seat is arranged on an outer side of the second portion. A coil portion is formed between the upper seat and the lower seat. At least one coil is coiled on the coil portion. The axial tube has an axial hole. A pressure guide block, an iron core spring, an iron core and a pressure relief block are provided in the axial hole. The pressure guide block has a water hole. The water hole communicates with the perforation. The iron core spring acts on the pressure guide block and the iron core. The iron core has an accommodating groove. A plug is provided in the accommodating groove. A pressure relief hole is formed in the pressure relief block. The first magnet is disposed in the pressure guide block or the upper seat. The second magnet is disposed in the pressure relief block or the lower seat. The first magnet and the second magnet form a magnetic route. The water outlet valve seat is disposed at the lower opening of the outer cylindrical portion. The water outlet valve seat has a water outlet. The water outlet communicates with the flow passage and the pressure relief hole.

In the solenoid valve provided by the present invention, when in the open state, the iron core is moved towards the pressure guide block, and the plug leaves the pressure relief opening, so that water can flow out to reduce the pressure between the upper seat and the diaphragm. The guide seat and the diaphragm are moved towards the pressure guide block. Another water flow can flow out from the water inlet through the flow passages and the water outlet. When in the closed state, the iron core spring and water pressure push against the iron core to close the pressure relief hole, and the diaphragm blocks the water flow in the water inlet via the water pressure and the force of the guide spring.

DETAILED DESCRIPTION OF THE PREFERRED EMBODIMENTS

Figure 1:
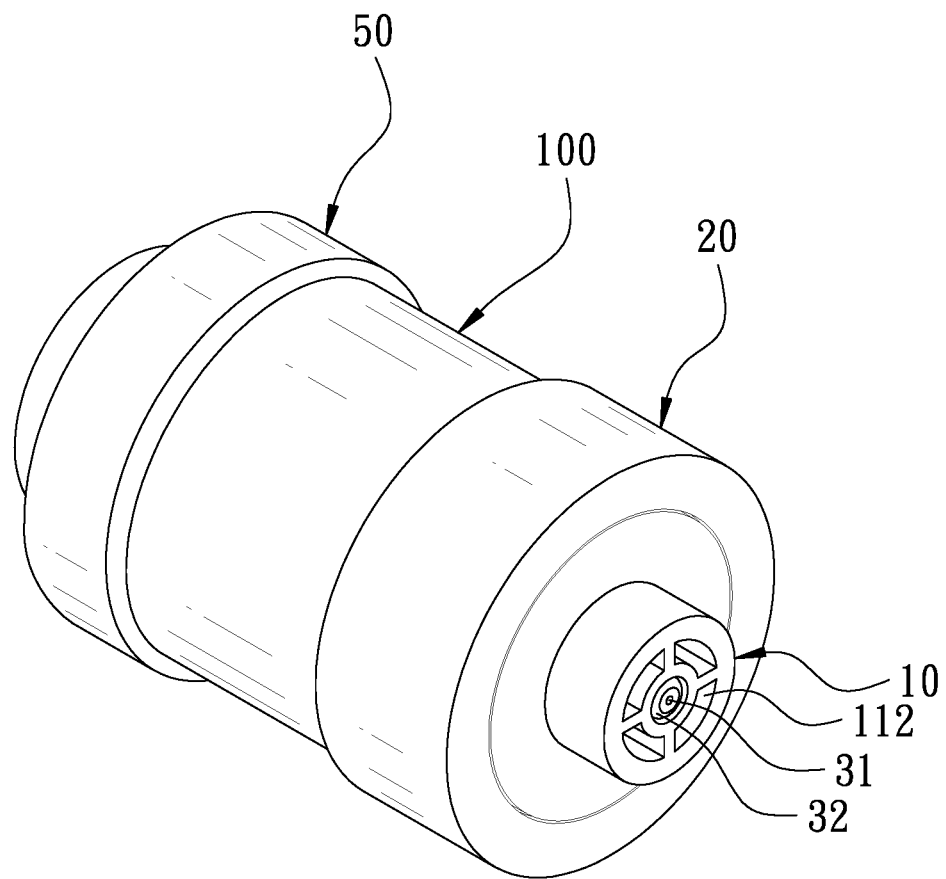
FIG. 1 is a perspective view of a preferred embodiment of the present invention.
Figure 2:
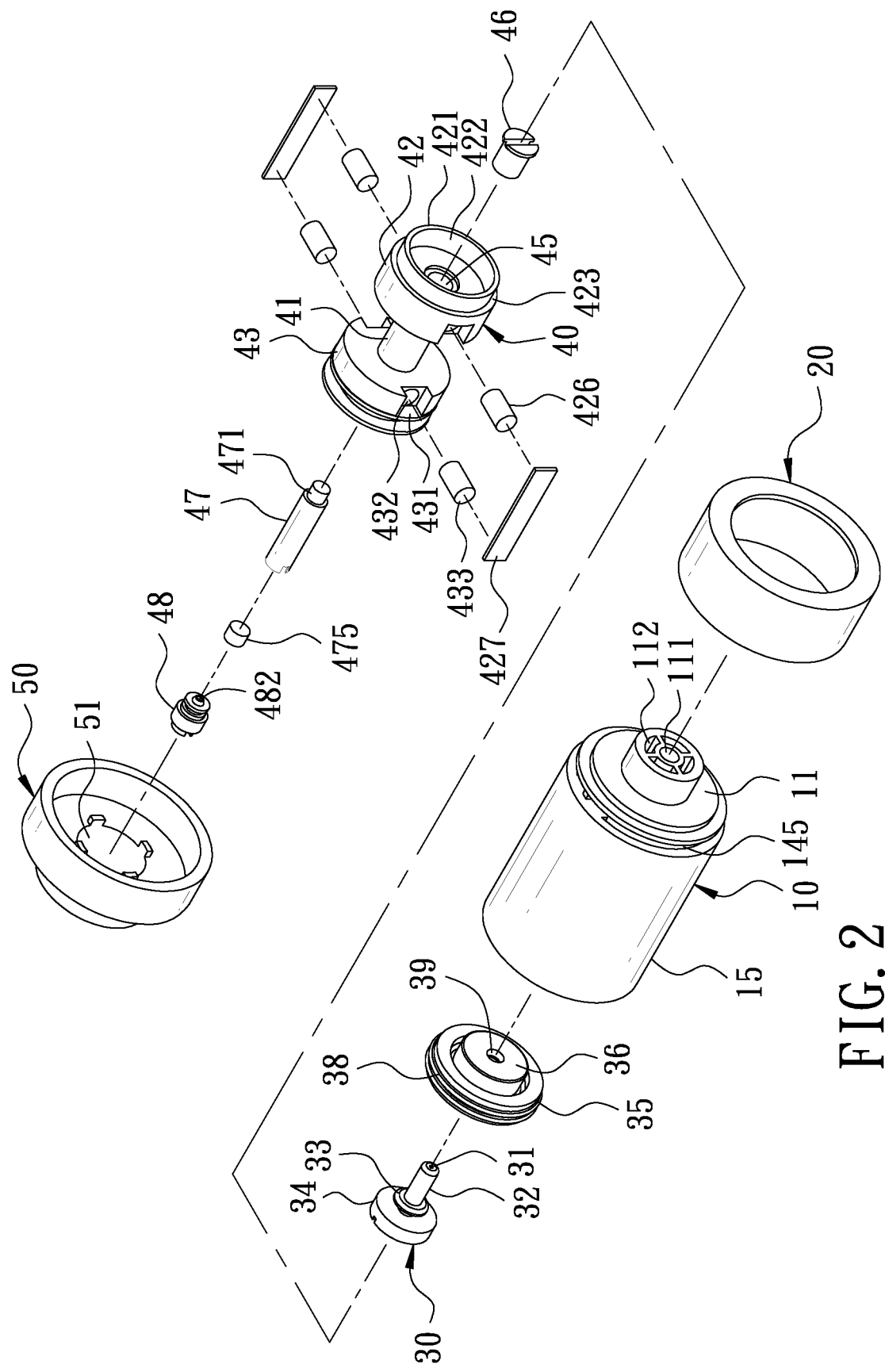
FIG. 2 is an exploded view of the preferred embodiment of the present invention.
Figure 3:
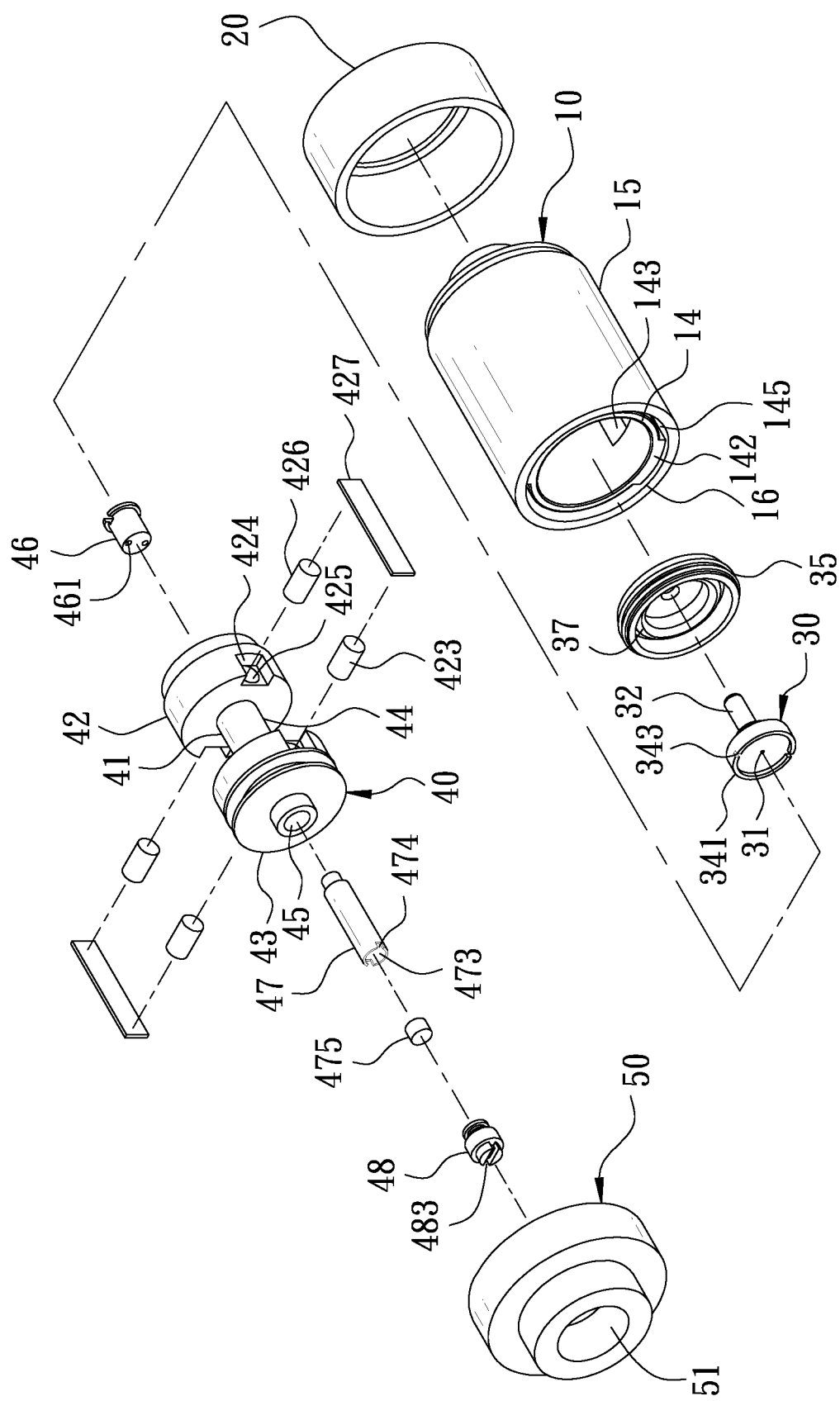
FIG. 3 is another exploded view of the preferred embodiment of the present invention.

Embodiments of the present invention will now be described, by way of example only, with reference to the accompanying drawings.

As shown in FIG. 1 through FIG. 4, the present invention discloses a solenoid valve 100. The solenoid valve 100 is installed in a non-contact automatic water flusher, such as an infrared sensor faucet or a urinal tap. The automatic water flusher includes a sensor electrically connected to the solenoid valve 100. The solenoid valve 100 comprises a water inlet valve seat 10, a water-blocking cover 20, a guide seat 30, a coil barrel 40, and a water outlet valve seat 50.

Figure 8:
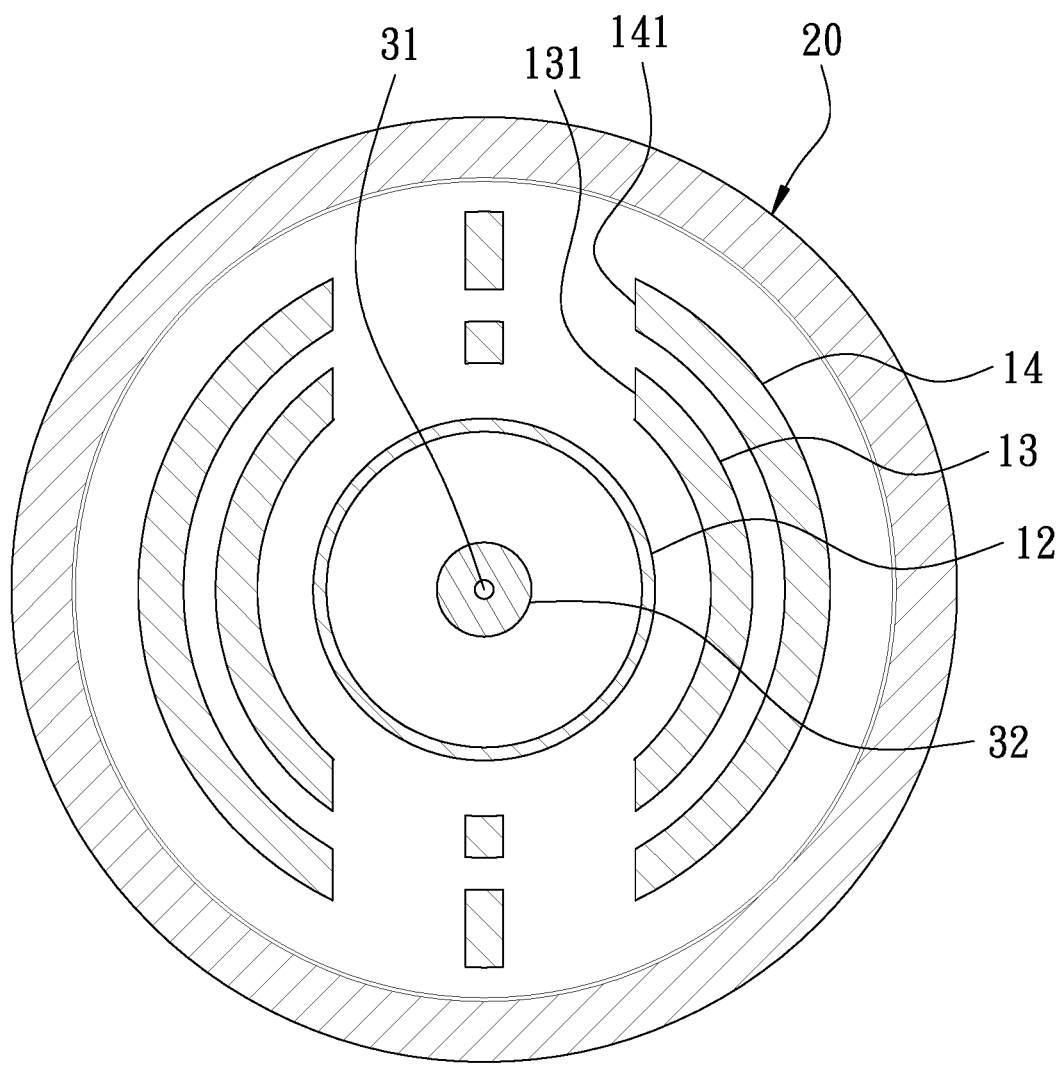
FIG. 8 is a cross-sectional view taken along line 8-8 of FIG. 7.

The water inlet valve seat 10 is a hollow cylinder. Referring to FIG. 8, the water inlet valve seat 10 includes a base 11, a first inner stop portion 12, a second inner stop portion 13, an inner cylindrical portion 14, and an outer cylindrical portion 15. The base 11 is a base plate. The base 11 has a guide hole 111 and a plurality of water inlets 112 surrounding the guide hole 111. The guide hole 111 and the water inlets 112 are connected to a water source. The first inner stop portion 12, the second inner stop portion 13, the inner 12 cylindrical portion 14 and the outer cylindrical portion 15 are axially arranged on one side 113 of the base 11, and are spaced apart from one other and arranged in a concentric circle in sequence outwardly from the water inlets 112. As shown in FIG. 8, the first inner stop portion 12 and the second inner stop portion 13 are annular walls 421. The inner cylindrical portion 14 and the outer cylindrical portion 15 are in a cylindrical shape. The second inner stop portion 13 and the inner cylindrical portion 14 each have a through hole 131, 141. The inner cylindrical portion 14 has an outer side provided with two arc-shaped protruding ribs 142 extending radially and outwardly. The protruding ribs 142 each have a wire hole 143. The ribs 142 are connected to the outer cylindrical portion 15, so that two flow passages 145 are formed between the inner cylindrical portion 14 and the outer cylindrical portion 15. The flow passages 145 communicate with the through holes 131, 141, respectively. A 24 lower opening 16 is formed on one end of the outer cylindrical portion 15 away from the base 11 of the water inlet valve seat 10.

The water-blocking cover 20 covers a part of the base 11 and a part of the outer cylindrical portion 15 to form the flow passages 145. In this embodiment, the outer cylindrical portion 15 and the base 11 are not closed. The flow passages 145 are formed by means of the water-blocking cover 20. Those skilled in the art can understand that the outer cylindrical portion 15 and the base 11 may be connected to each other to form the flow passages 145, without using the water-blocking cover 20.

The guide seat 30 is disposed in the water inlet valve seat 10. The guide seat 30 has a perforation 31. The guide seat 30 includes a guide shaft 32, a first guide portion 33, a second guide portion 34 and a diaphragm 35. One end of the guide shaft 32 is movably arranged in the guide hole 111, so that the perforation 31 is connected to the water source. The first guide portion 33 and the second guide portion 34 are disposed on the other end of the guide shaft 32 and extend radially and outwardly. The first guide portion 33 and the second guide portion 34 are disc-shaped. The first guide portion 33 and the second guide portion 34 are spaced apart from each other. The first guide portion 33 is pressed against the base 11 in a closed position. The second guide portion 34 includes a guide ring 341 and a guide spring 342. The guide ring 341 has two notches 343. The guide spring 342 is located in the guide ring 341 and is pressed against the second guide portion 34. The first guide portion 33 is pressed against the coil barrel 40 in in an open position.

Figure 4:
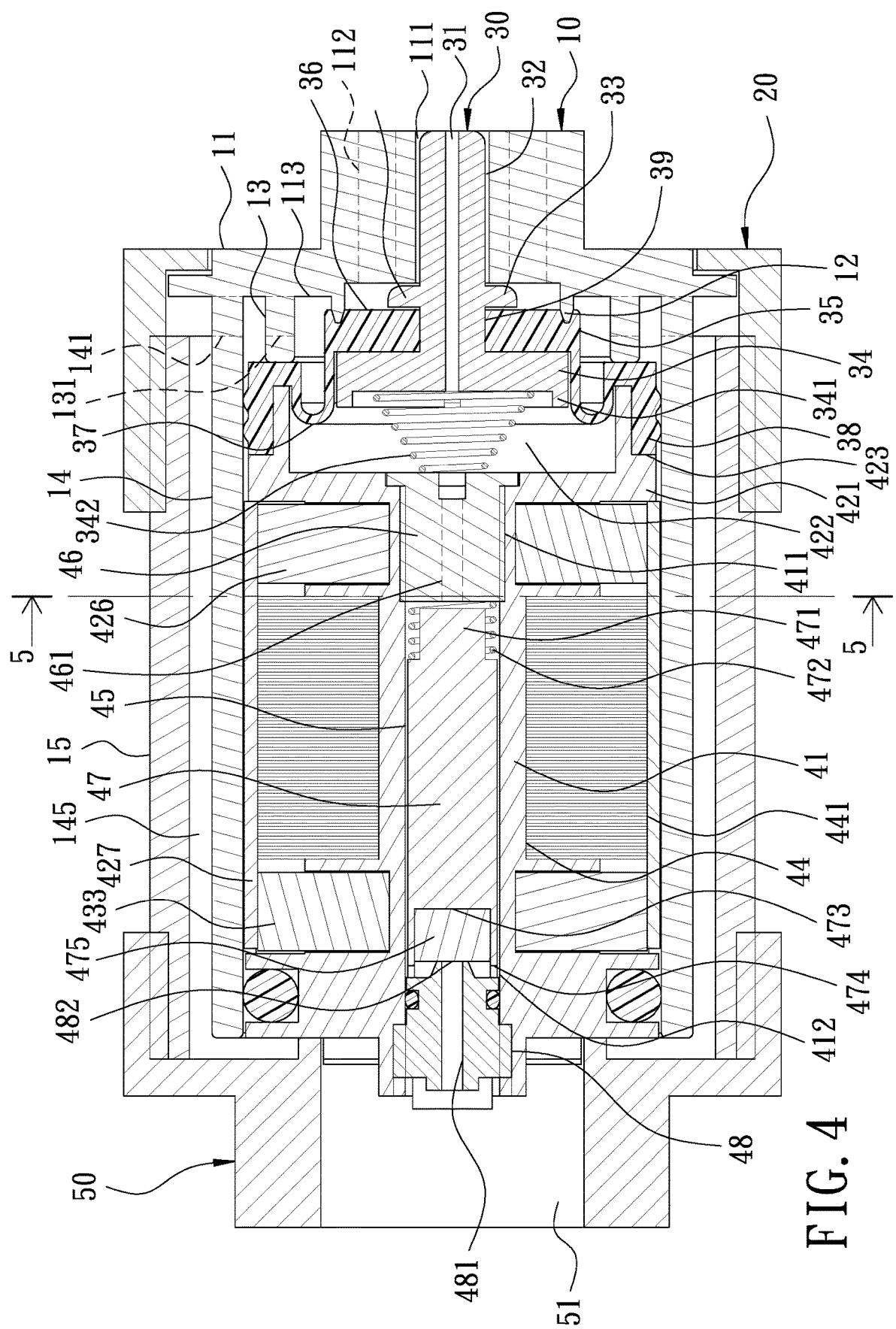
FIG. 4 is a cross-sectional view of the preferred embodiment of the present invention.

The diaphragm 35 has a restricting portion 36, a connecting portion 37 and a fixing portion 38 from inside to outside. The restricting portion 36 is substantially disc-shaped. The restricting portion 36 has an aperture 39. The guide shaft 32 is inserted into the aperture 39. The restricting portion 36 is located between the first guide portion 33 and the second guide portion 34, so that the restricting portion 36 is linked with the guide seat 30. When in the closed position, the restricting portion 36 is pushed by the second guide portion 34 to abut against the first inner stop portion 12. The connecting portion 37 connects the restricting portion 36 and the fixing portion 38. The cross-section of the connecting portion 37 is c-shaped or n-shaped. As shown in FIG. 4, when in the open position, the connecting portion 37 is pressed to move towards the coil barrel 40. The fixing portion 38 is secured to the coil barrel 40 and abuts against the inner surface of the inner cylindrical portion 14.

The coil barrel 40 is disposed in the inner cylindrical portion 14 of the water inlet valve seat 10. The coil barrel 40 includes an axial tube 41, an upper seat 42, and a lower seat 43. Two ends of the axial tube 41 are formed with a first portion 411 and a second portion 412. The upper seat 42 is arranged radially on the outer side of the first portion 411. The upper seat 42 includes an annular wall 421 extending axially and outwardly. The annular wall 421 is formed with an opening 422. The guide spring 342 is against the bottom of the opening 422. A retaining recess 423 is formed on the outer side of the annular wall 421 for receiving the fixing portion 38, so that only the opening 422 is in communication with the perforation 31. The lower seat 43 is arranged radially on the outer side of the second portion 412. A coil portion 44 is formed between the upper seat 42 and the lower seat 43. At least one coil 441 is coiled on the coil portion 44. The outer sides of the upper seat 42 and the lower seat 43 are respectively recessed to form a pair of rectangular grooves 424, 431. The rectangular grooves 424, 431 are located at both ends in the radial direction. Circular holes 425, 432 are defined in the bottoms of the rectangular grooves 424, 431. Cylindrical magnets 426, 433 are provided in the circular holes 425, 432, respectively. Elongate magnetically conductive sheets 427 are connected between the rectangular grooves 424 of the upper seat 42 and the rectangular grooves 431 of the lower seat 43, respectively. The magnetically conductive sheets 427 are located outside the coil 441 and the magnets 426, 433. Two ends of each of the magnetically conductive sheets 427 are connected to the magnets 426, 433, respectively. The magnets 426 of the upper seat 42 and the magnets 433 of the lower seat 43 are of opposite polarity. In this embodiment, the N poles of the magnets 426 of the upper seat 42 are directed towards the magnetically conductive sheet 427, and the S poles of the magnets 433 of the lower seat 43 are directed towards the other magnetically conductive sheet 427, so as to enhance the magnetic force. The magnetically conductive sheets 427 are not essential components in the invention. Two pairs of magnets 426, 433 form two complete magnetic routes. The magnetically conductive sheets 427 are configured to strengthen the magnetic force. The solenoid valve 100 has a simple structure and can be produced easily. The guide seat 30 is made of a non-magnetic material, so it is able to reduce magnetic field interference.

Figure 5:
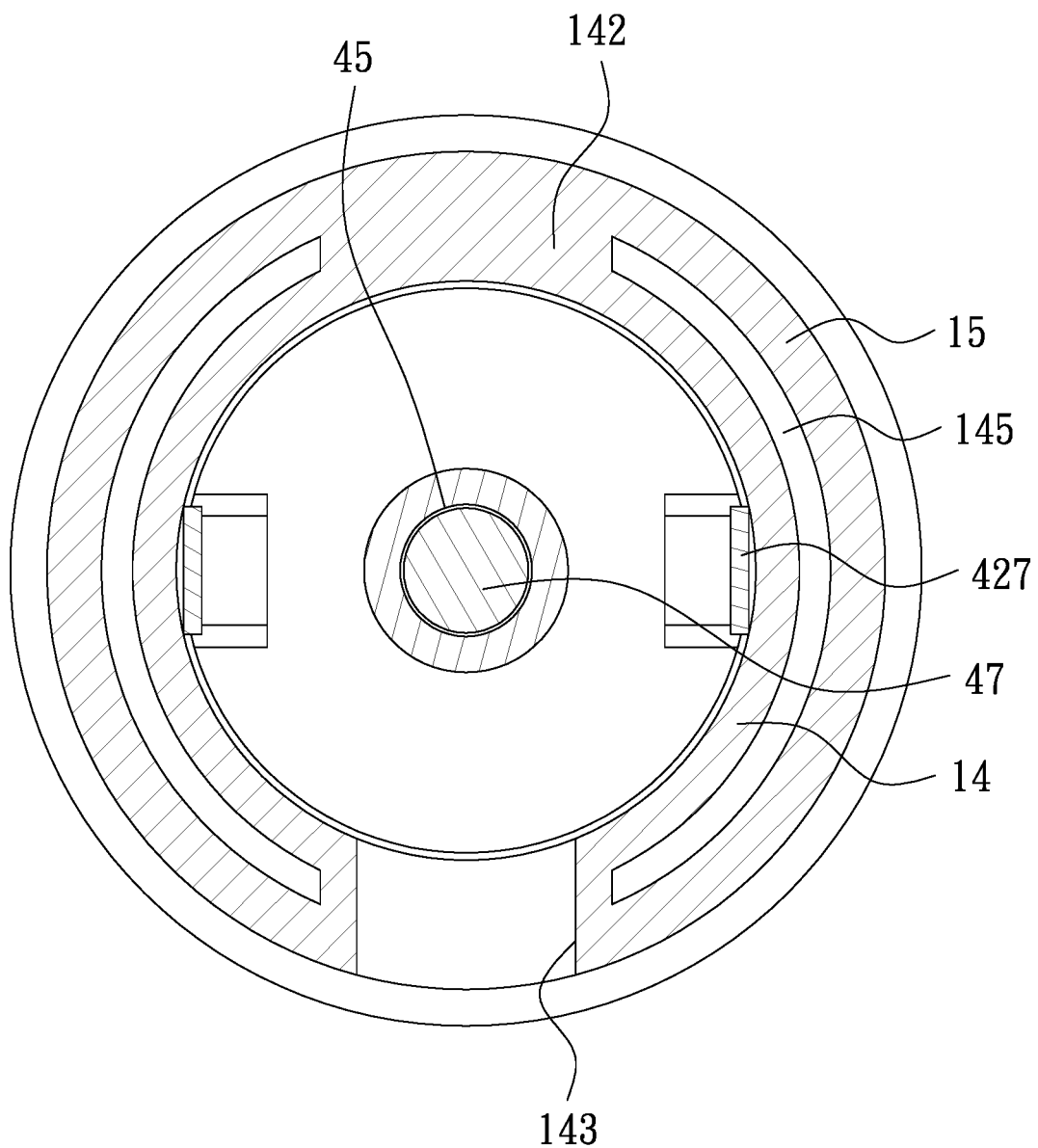
FIG. 5 is a cross-sectional view taken along line 5-5 of FIG. 4.

The axial tube 41 has an axial hole 45 passing through both ends thereof. A pressure guide block 46, an iron core 47 and a pressure relief block 48 are provided in the axial hole 45. The pressure guide block 46 is made of a magnetically conductive material. The pressure guide block 46 is screwed to the axial hole 45 and located at the first portion 411. The pressure guide block 46 is against the other end of the guide spring 342. The pressure guide block 46 has a pair of water holes 461. The water holes 461 of the pressure guide block 46 communicate with the opening 422. The iron core 47 is located between the pressure guide block 46 and the pressure relief block 48. The outer diameter of the iron core 47 is slightly smaller than the inner diameter of the axial hole 45, so that a gap is formed between the iron core 47 and the axial hole 45 for water to pass there through. As shown in FIG. 5, one end of the iron core 47, facing the pressure guide block 46, has a receiving groove 471. The receiving groove 471 communicates with the water holes 461 of the pressure guide block 46. The receiving groove 471 is configured to receive an iron core spring 472. Two ends of the iron core spring 472 are against the pressure guide block 46 and the iron core 47, respectively. The other end of the iron core 47 has an accommodating groove 473. The wall of the accommodating groove 473 is formed with two notches 474. A plug 475 is provided in the accommodating groove 473. The plug 475 includes an inner iron core covered with an outer rubber layer. The outer side of the plug 475 and the bottom of the notch 474 are on the same plane. The pressure relief block 48 is screwed to the axial hole 45 and located at the second portion 412. A pressure relief hole 481 is formed in the pressure relief block 48. One end of the pressure relief block 48 is formed with a tapered pressure relief opening 482. When in the closed position, the iron core spring 472 enables the wall of the accommodating groove 473 to be pressed against the pressure relief block 48, so as to avoid excessive compression of the plug 475. The plug 475 is pressed against the pressure relief opening 482 to close the pressure relief hole 481. One end of the pressure relief block 48 is formed with a linear adjustment groove 483. The outer wall of the pressure relief block 48 is formed with an external thread, and the axial hole 45 of the second portion 412 is formed with an internal thread, so that the gap between the pressure relief block 48 and the iron core 47 can be adjusted.

The water outlet valve seat 50 is located at the lower opening 16 of the water inlet valve seat 10. The water outlet valve seat 50 has a water outlet 51. One end of the water outlet 51 is in communication with the flow passages 145 and the pressure relief hole 481. The axial tube 41 extends out of the lower seat 43 and is located in the axial hole 45. The other end of the water outlet 51 may be connected to the automatic water flusher.

Figure 6:
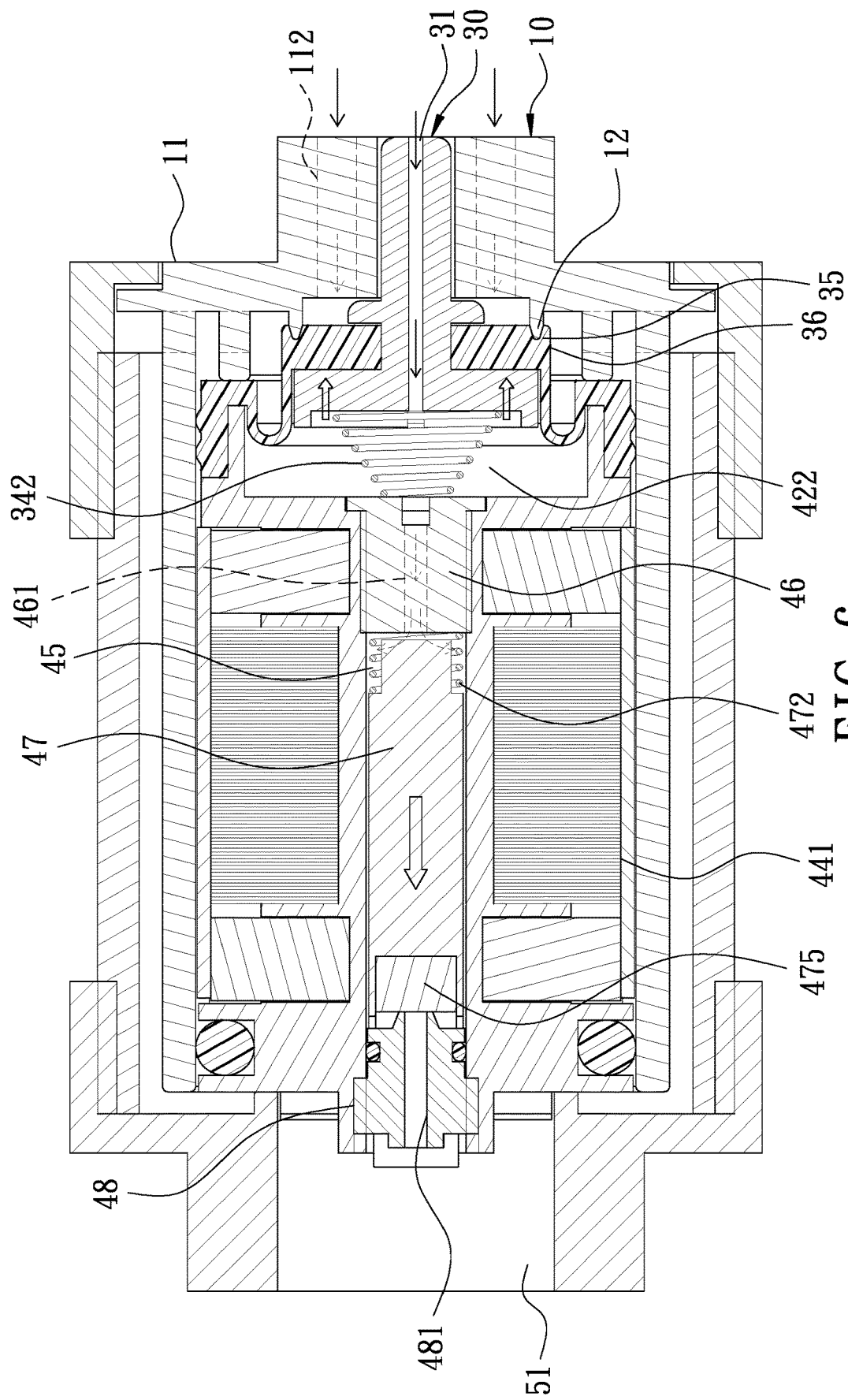
FIG. 6 is a schematic view of the preferred embodiment of the present invention when in use, illustrating a closed state.

Referring to FIG. 6, when in use, the tap water of the water source will flow into both the perforation 31 and the water inlets 112. The first water flow passes through the perforation 31, the opening 422 and the water inlets 461 to enter the axial hole 45. The water flow and the elastic force of the iron core spring 472 will push against the iron core 47, so that the iron core 47 is pushed towards the pressure relief block 48 to close the pressure relief hole 481. The pressure of the opening 422 and the elastic force of the guide spring 342 will push the guide seat 30 and the diaphragm 35 towards the base 11, so that the restricting portion 36 of the diaphragm 35 will be against the first inner stop portion 12. The second water flow passes through the water inlets 112 to enter the water inlet valve seat 10. Because the sum of the pressure of the opening 422 and the elastic force of the guide spring 342 is greater than the pressure of the second water flow, the second water flow will be blocked by the diaphragm 35 to keep the solenoid valve 100 in a closed state.

Figure 7:
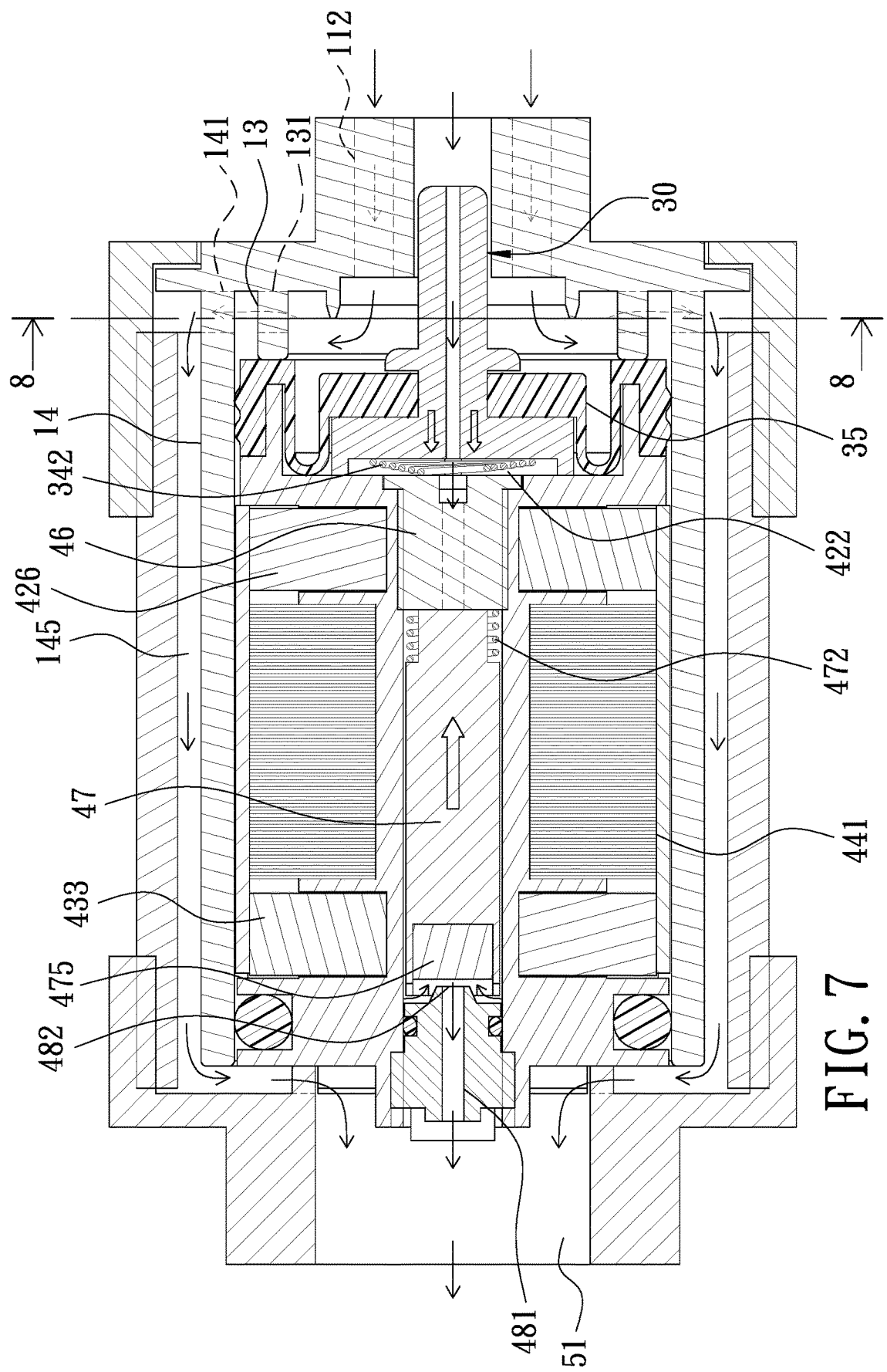
FIG. 7 is a schematic view of the preferred embodiment of the present invention when in use, illustrating an open state.

Referring to FIG. 7, the input current to the coil 441 generates a positive incremental magnetic field in the same direction as the magnetic force lines of the magnets. The iron core 47 and the pressure guide block 46 generate a magnetic attraction force, so that the iron core 47 is moved towards the pressure guide block 46. The core spring 472 is compressed. When the plug 475 leaves the pressure relief opening 482, the first water flow can flow out via the gap, the pressure relief opening 482, the pressure relief hole 481 and the water outlet 51 to reduce the pressure of the opening 422. At this time, the sum of the pressure of the opening 422 and the elastic force of the guide spring 342 is less than the pressure of the second water flow. The pressure of the second water flow will push the guide seat 30 and the diaphragm 35 towards the pressure guide block 46 to compress the guide spring 342, so that the water inlets 112, the through hole 131 of the second inner stop portion 13, the through hole 141 of the inner cylindrical portion 14, and the flow passages 145 are in communication with one another. The second water flow can flow out via the through hole 131 of the second inner stop portion 13, the through hole 141 of the inner cylindrical portion 14, the flow passages 145 and the water outlet 51. The second water flow flows into the automatic water flusher together with the first water flow. After the current is cut off, the magnetic routes of the magnets 426, 433 and the magnetically conductive sheets 427 keep the solenoid valve 100 in an open state, thereby saving electric energy.

Referring to FIG. 6, when the input current to the coil 441 generates a reverse magnetic field, the iron core 47 and the pressure guide block 46 reduce attraction, so that the iron core 47 is moved towards the pressure relief block 48 to close the pressure relief hole 481 and increase the pressure of the opening 422. The guide seat 30 and the diaphragm 35 are moved towards the first inner stop portion 12, and the diaphragm 35 abuts against the first inner stop portion 12 to block the second water flow, so as to shut off the water flow. After the current is cut off, through the elastic force of the iron core spring 472, the water pressure of the first water flow is simultaneously introduced to push against the iron core 47 to keep the pressure relief hole 481 closed, and the pressure of the opening 422 and the elastic force of the guide spring 342 block the second water flow to achieve a bistable effect. When water hammer occurs, water hammer will further push against the iron core 47 to increase the force to close the pressure relief hole 481. Simultaneously, the sum of the pressure of the opening 422 and the elastic force of the guide spring 342 is still greater than the pressure of the second water flow, thereby maintaining the closed state, so as to achieve the effect of a bistable solenoid valve.

Figure 9:
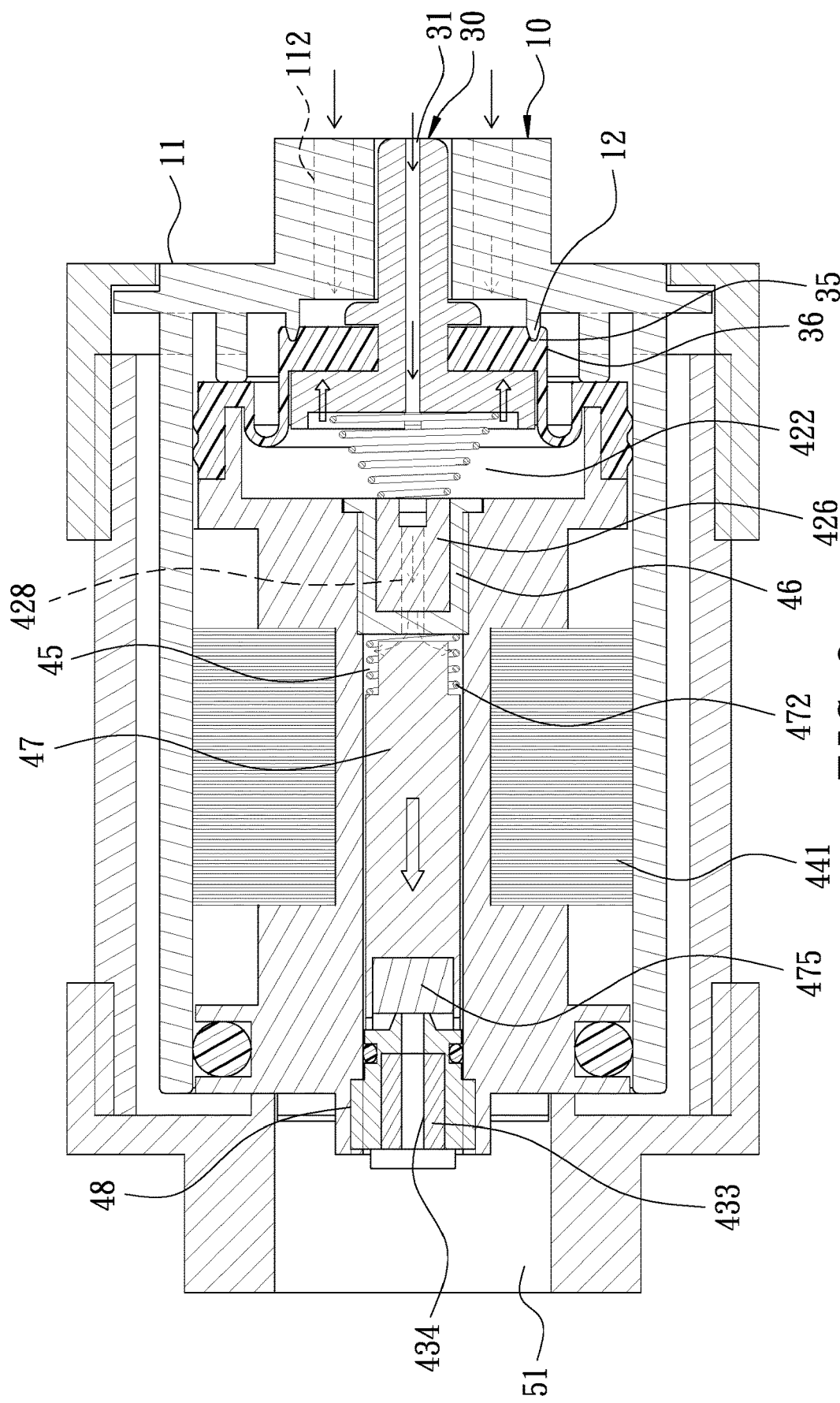
FIG. 9 is a cross-sectional view of another embodiment of the present invention, showing that the magnets are arranged in different positions.
Figure 10:
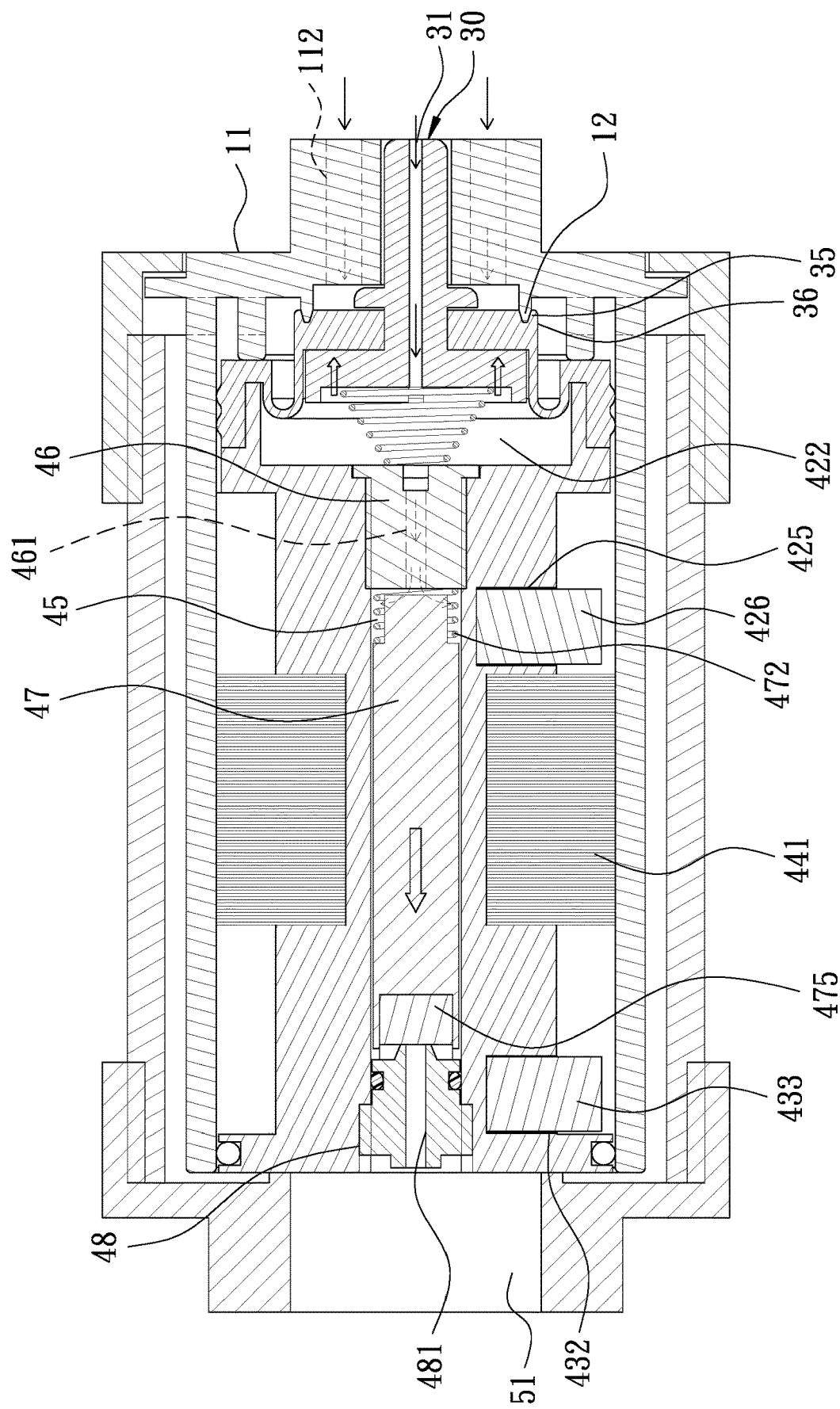
FIG. 10 is a cross-sectional view of a further embodiment of the present invention, showing that the magnets are arranged in different positions.

In the present invention, the magnetic routes are formed by two pairs of magnets. The number of the magnets are not limited to two pairs, which may be one pair or more than two pairs. A magnetic route is formed by a single magnet 426 and a single magnet 433 that are located on the same side. The single magnet 426 and the single magnet 433 may be arranged in different positions. The magnet 426 may be disposed in the pressure guide block 46 or in the circular hole 425 of the upper seat 42. The circular hole 425 may be located close to the pressure guide block 46 or the iron core 47. The magnet 433 may be disposed in the pressure relief block 48 or in the circular hole 432 of the lower seat 43. The circular hole 432 may be located close to the pressure relief block 48 or the iron core 47. Referring to FIG. 9, the pressure guide block 46, the pressure relief block 48 or both are made of a magnetically conductive material. The magnet 426 is disposed in the pressure guide block 46. The magnet 426 has a first hole 428 therein. The magnet 433 is disposed in the pressure relief block 48. The magnet 433 has a second hole 434 therein. Referring to FIG. 10, the pressure guide block 46 is made of a non-magnetically conductive material. The pressure relief block 48 is made of a magnetically conductive material. The magnet 426 is disposed in the circular hole 425 of the upper seat 42. The circular hole 425 is located close to the end of the iron core 47. The magnet 433 is disposed in the circular hole 432 of the lower seat 43. The circular hole 432 is located close to the pressure relief block 48.

Although particular embodiments of the present invention have been described in detail for purposes of illustration, various modifications and enhancements may be made without departing from the spirit and scope of the present invention. Accordingly, the present invention is not to be limited except as by the appended claims.

What is claimed is:

1. A solenoid valve, comprising:
a water inlet valve seat, including a base, the base having a guide hole and at least one water inlet, one side of the base being formed with a first inner stop portion, an inner cylindrical portion and an outer cylindrical portion, the inner cylindrical portion having a through hole, a flow passage being formed between the inner cylindrical portion and the outer cylindrical portion, the flow passage communicating with the through hole of the inner cylindrical portion, the outer cylindrical portion having a lower opening;
a guide seat, disposed in the water inlet valve seat, the guide seat having a perforation, the guide seat including a guide shaft, a guide spring and a diaphragm, the guide shaft being arranged in the guide hole, one end of the guide spring abutting against the guide seat, the diaphragm being sleeved on the guide shaft and abutting against an inner surface of the inner cylindrical portion;
a coil barrel, disposed in the water inlet valve seat, the coil barrel including an axial tube, an upper seat and a lower seat, two ends of the axial tube being formed with a first portion and a second portion, the upper seat being arranged on an outer side of the first portion, another end of the guide spring abutting against the upper seat, the lower seat being arranged on an outer side of the second portion, a coil portion being formed between the upper seat and the lower seat, at least one coil being coiled on the coil portion;
the axial tube having an axial hole, a pressure guide block, an iron core spring, an iron core and a pressure relief block being provided in the axial hole, the pressure guide block having a water hole, the water hole communicating with the perforation, the iron core spring acting on the pressure guide block and the iron core, the iron core having an accommodating groove, a plug being provided in the accommodating groove, a pressure relief hole being formed in the pressure relief block;
a first magnet and a second magnet, the first magnet being disposed in one of the pressure guide block and the upper seat, the second magnet being disposed in one of the pressure relief block and the lower seat, the first magnet and the second magnet forming a magnetic route;
a water outlet valve seat, disposed at the lower opening of the outer cylindrical portion, the water outlet valve seat having a water outlet, the water outlet communicating with the flow passage and the pressure relief hole.

2. The solenoid valve as claimed in claim 1, wherein the pressure guide block is screwed to the axial hole and located at the first portion, the pressure relief block is screwed to the axial hole and located at the second portion, the iron core is located between the pressure guide block and the pressure relief block; the solenoid valve has an open state and a closed state; when in the open state, the iron core is moved towards the pressure guide block for the water hole to communicate with the pressure relief hole, and the guide seat and the diaphragm are moved towards the pressure guide block for the water inlet to communicate with the through hole of the inner cylindrical portion; when in the closed state, the iron core is moved towards the pressure relief block, the plug abuts against the pressure relief hole of the pressure relief block, and the diaphragm abuts against the first inner stop portion, so that the water inlet is not in communication with the through hole of the inner cylindrical portion.

3. The solenoid valve as claimed in claim 1, wherein the coil barrel includes a pair of magnetically conductive sheets, and the magnetically conductive sheets are connected to the magnets of the upper seat and the magnets of the lower seat, respectively.

4. The solenoid valve as claimed in claim 1, wherein the inner cylindrical portion has an outer side provided with at least one protruding rib extending radially and outwardly, the protruding rib has a wire hole, and the rib is connected to the outer cylindrical portion so that the flow passage is formed between the inner cylindrical portion and the outer cylindrical portion.

5. The solenoid valve as claimed in claim 1, wherein the guide seat includes a first guide portion and a second guide portion, the first guide portion and the second guide portion are spaced apart from each other, the diaphragm includes a restricting portion, a connecting portion and a fixing portion, the restricting portion is arranged on the guide seat and located between the first guide portion and the second guide portion, the connecting portion connects the restricting portion and the fixing portion, and the fixing portion is arranged on the upper seat.

6. The solenoid valve as claimed in claim 1, wherein the iron core has an outer diameter slightly smaller than an inner diameter of the axial hole.

7. The solenoid valve as claimed in claim 1, wherein the iron core has a receiving groove, the receiving groove communicates with the water hole of the pressure guide block, and the receiving groove is configured to receive the iron core spring.

8. The solenoid valve as claimed in claim 1, wherein a wall of the accommodating groove is formed with two notches.

9. The solenoid valve as claimed in claim 1, wherein the pressure relief block is screwed to the axial hole, and the pressure relief block is formed with an adjustment groove.

10. A solenoid valve, comprising:
a water inlet valve seat, having a water inlet and a lower opening;
a coil barrel, disposed in the water inlet valve seat, the coil barrel including an axial tube, an upper seat and a lower seat, two ends of the axial tube being formed with a first portion and a second portion, the upper seat being arranged on an outer side of the first portion, the lower seat being arranged on an outer side of the second portion, a coil portion being formed between the upper seat and the lower seat, at least one coil being coiled on the coil portion;
the axial tube having an axial hole, a pressure guide block, an iron core spring, an iron core and a pressure relief block being provided in the axial hole, the pressure guide block having a water hole, the water inlet communicating with the water hole, the iron core spring acting on the pressure guide block and the iron core, the iron core having an accommodating groove, a plug being provided in the accommodating groove, a pressure relief hole being formed in the pressure relief block;
a first magnet and a second magnet, the first magnet being disposed in one of the pressure guide block and the upper seat, the second magnet being disposed in one of the pressure relief block and the lower seat, the first magnet and the second magnet forming a magnetic route;
a water outlet valve seat, disposed at the lower opening, the water outlet valve seat having a water outlet, the water outlet communicating with the pressure relief hole.

11. The solenoid valve as claimed in claim 10, wherein the pressure guide block is screwed to the axial hole and located at the first portion, the pressure relief block is screwed to the axial hole and located at the second portion, the iron core is located between the pressure guide block and the pressure relief block; the solenoid valve has an open state and a closed state; when in the open state, the iron core is moved towards the pressure guide block for the water hole to communicate with the pressure relief hole; when in the closed state, the iron core is moved towards the pressure relief block, and the plug abuts against the pressure relief hole of the pressure relief block.

12. The solenoid valve as claimed in claim 10, wherein the coil barrel includes a pair of magnetically conductive sheets, and the magnetically conductive sheets are connected to the magnets of the upper seat and the magnets of the lower seat, respectively.

* * * * *